US009280906B2

(12) United States Patent
Arora et al.

(10) Patent No.: US 9,280,906 B2
(45) Date of Patent: Mar. 8, 2016

(54) PROMPTING A USER FOR INPUT DURING A SYNCHRONOUS PRESENTATION OF AUDIO CONTENT AND TEXTUAL CONTENT

(71) Applicant: Audible, Inc., Newark, NJ (US)

(72) Inventors: Ajay Arora, New York, NY (US); Guy Ashley Story, Jr., New York, NY (US)

(73) Assignee: Audible. Inc., Newark, NJ (US)

( * ) Notice: Subject to any disclaimer, the term of this patent is extended or adjusted under 35 U.S.C. 154(b) by 430 days.

(21) Appl. No.: 13/758,749

(22) Filed: Feb. 4, 2013

(65) Prior Publication Data
US 2014/0223272 A1 Aug. 7, 2014

(51) Int. Cl.
*G06F 17/27* (2006.01)
*G09B 5/06* (2006.01)

(52) U.S. Cl.
CPC .......................................... *G09B 5/06* (2013.01)

(58) Field of Classification Search
CPC ..................................................... G09B 6/062
See application file for complete search history.

(56) References Cited

U.S. PATENT DOCUMENTS

| 5,203,705 | A | 4/1993 | Hardy et al. |
| 5,351,189 | A | 9/1994 | Doi et al. |
| 5,657,426 | A | 8/1997 | Waters et al. |
| 5,737,489 | A | 4/1998 | Chou et al. |
| 5,978,754 | A | 11/1999 | Kumano |
| 6,076,059 | A | 6/2000 | Glickman et al. |
| 6,208,956 | B1 | 3/2001 | Motoyama |
| 6,256,610 | B1 | 7/2001 | Baum |
| 6,260,011 | B1 | 7/2001 | Heckerman et al. |
| 6,356,922 | B1 | 3/2002 | Schilit et al. |
| 6,766,294 | B2 | 7/2004 | MacGinite et al. |
| 6,912,505 | B2 | 6/2005 | Linden et al. |
| 7,107,533 | B2 | 9/2006 | Duncan et al. |
| 7,231,351 | B1 | 6/2007 | Griggs |
| 8,106,285 | B2 | 1/2012 | Gerl et al. |
| 8,109,765 | B2 | 2/2012 | Beattie et al. |

(Continued)

FOREIGN PATENT DOCUMENTS

| CN | 103988193 A | 8/2014 |
| CN | 104662604 A | 5/2015 |

(Continued)

OTHER PUBLICATIONS

Arar, Y., Blio E-Book Platform: No Reader (Yet), But Great Graphics, Jan. 7, 2010.

(Continued)

*Primary Examiner* — Scott Baderman
*Assistant Examiner* — Asher Kells
(74) *Attorney, Agent, or Firm* — Knobbe, Martens, Olson & Bear, LLP

(57) ABSTRACT

A selective synchronization service may facilitate the synchronous presentation of corresponding audio content and textual content. Corresponding words in companion items of audio and textual content may be selected for synchronous presentation. A corresponding word may be selected for synchronous audible and textual presentation according to any of a number of criteria. Further, a corresponding word may be selected for a modified synchronous presentation, in which the audible and/or textual presentation of the corresponding word is modified. Alternately, a corresponding word may be selected for an audible presentation without a textual presentation, or a textual presentation without an audible presentation.

27 Claims, 10 Drawing Sheets

(56) References Cited

U.S. PATENT DOCUMENTS

| | | | |
|---|---|---|---|
| 8,131,545 B1 | 3/2012 | Moreno et al. | |
| 8,131,865 B2 | 3/2012 | Rebaud et al. | |
| 8,442,423 B1 | 5/2013 | Ryan et al. | |
| 8,527,272 B2 | 9/2013 | Qin et al. | |
| 8,548,618 B1 | 10/2013 | Story, Jr. et al. | |
| 8,577,668 B2 | 11/2013 | Rosart et al. | |
| 8,855,797 B2 | 10/2014 | Story, Jr. et al. | |
| 8,862,255 B2 | 10/2014 | Story, Jr. et al. | |
| 8,948,892 B2 | 2/2015 | Story, Jr. et al. | |
| 9,037,956 B2 | 5/2015 | Goldstein et al. | |
| 9,099,089 B2 | 8/2015 | Dzik et al. | |
| 2002/0002459 A1 | 1/2002 | Lewis et al. | |
| 2002/0007349 A1 | 1/2002 | Yuen | |
| 2002/0041692 A1 | 4/2002 | Seto et al. | |
| 2002/0046023 A1 | 4/2002 | Fujii et al. | |
| 2002/0116188 A1 | 8/2002 | Amir et al. | |
| 2002/0133350 A1* | 9/2002 | Cogliano | 704/270 |
| 2002/0184189 A1 | 12/2002 | Hay et al. | |
| 2003/0023442 A1 | 1/2003 | Akabane et al. | |
| 2003/0061028 A1 | 3/2003 | Dey et al. | |
| 2003/0077559 A1 | 4/2003 | Braunberger et al. | |
| 2003/0083885 A1 | 5/2003 | Frimpong-Ansah | |
| 2003/0115289 A1 | 6/2003 | Chinn et al. | |
| 2004/0261093 A1 | 12/2004 | Rebaud et al. | |
| 2005/0022113 A1 | 1/2005 | Hanlon | |
| 2006/0148569 A1 | 7/2006 | Beck | |
| 2007/0016314 A1 | 1/2007 | Chan et al. | |
| 2007/0061487 A1 | 3/2007 | Moore et al. | |
| 2007/0136459 A1 | 6/2007 | Roche et al. | |
| 2007/0276657 A1 | 11/2007 | Gournay et al. | |
| 2007/0282844 A1 | 12/2007 | Kim et al. | |
| 2008/0005656 A1 | 1/2008 | Pang et al. | |
| 2008/0027726 A1 | 1/2008 | Hansen et al. | |
| 2008/0039163 A1 | 2/2008 | Eronen et al. | |
| 2008/0140412 A1* | 6/2008 | Millman et al. | 704/270 |
| 2008/0177822 A1 | 7/2008 | Yoneda | |
| 2008/0294453 A1 | 11/2008 | Baird-Smith et al. | |
| 2009/0047003 A1 | 2/2009 | Yamamoto | |
| 2009/0136213 A1 | 5/2009 | Calisa et al. | |
| 2009/0210213 A1 | 8/2009 | Cannon et al. | |
| 2009/0222520 A1 | 9/2009 | Sloo et al. | |
| 2009/0228570 A1 | 9/2009 | Janik et al. | |
| 2009/0233705 A1 | 9/2009 | Lemay et al. | |
| 2009/0239202 A1* | 9/2009 | Stone | 434/178 |
| 2009/0276215 A1 | 11/2009 | Hager | |
| 2009/0281645 A1 | 11/2009 | Kitahara et al. | |
| 2009/0282093 A1 | 11/2009 | Allard et al. | |
| 2009/0305203 A1 | 12/2009 | Okumura et al. | |
| 2009/0319273 A1 | 12/2009 | Mitsui et al. | |
| 2010/0042682 A1 | 2/2010 | Kaye | |
| 2010/0042702 A1 | 2/2010 | Hanses | |
| 2010/0064218 A1 | 3/2010 | Bull et al. | |
| 2010/0070575 A1 | 3/2010 | Bergquist et al. | |
| 2010/0225809 A1 | 9/2010 | Connors et al. | |
| 2010/0279822 A1 | 11/2010 | Ford | |
| 2010/0286979 A1 | 11/2010 | Zangvil et al. | |
| 2010/0287256 A1 | 11/2010 | Neilio | |
| 2011/0066438 A1 | 3/2011 | Lindahl et al. | |
| 2011/0067082 A1 | 3/2011 | Walker | |
| 2011/0087802 A1 | 4/2011 | Witriol et al. | |
| 2011/0119572 A1 | 5/2011 | Jang et al. | |
| 2011/0153330 A1 | 6/2011 | Yazdani et al. | |
| 2011/0177481 A1 | 7/2011 | Haff et al. | |
| 2011/0184738 A1 | 7/2011 | Kalisky et al. | |
| 2011/0191105 A1 | 8/2011 | Spears | |
| 2011/0231474 A1 | 9/2011 | Locker et al. | |
| 2011/0246175 A1 | 10/2011 | Yi et al. | |
| 2011/0288861 A1 | 11/2011 | Kurzweil et al. | |
| 2011/0288862 A1 | 11/2011 | Todic | |
| 2011/0296287 A1 | 12/2011 | Shahraray et al. | |
| 2011/0320189 A1 | 12/2011 | Carus et al. | |
| 2012/0030288 A1 | 2/2012 | Burckart et al. | |
| 2012/0109640 A1 | 5/2012 | Anisimovich et al. | |
| 2012/0150935 A1 | 6/2012 | Frick et al. | |
| 2012/0166180 A1 | 6/2012 | Au | |
| 2012/0197998 A1 | 8/2012 | Kessel et al. | |
| 2012/0245719 A1 | 9/2012 | Story, Jr. et al. | |
| 2012/0245720 A1 | 9/2012 | Story, Jr. et al. | |
| 2012/0245721 A1 | 9/2012 | Story, Jr. et al. | |
| 2012/0246343 A1 | 9/2012 | Story, Jr. et al. | |
| 2012/0310642 A1* | 12/2012 | Cao et al. | 704/235 |
| 2012/0315009 A1 | 12/2012 | Evans et al. | |
| 2012/0324324 A1 | 12/2012 | Hwang et al. | |
| 2013/0041747 A1 | 2/2013 | Anderson et al. | |
| 2013/0073449 A1 | 3/2013 | Voynow et al. | |
| 2013/0073675 A1 | 3/2013 | Hwang et al. | |
| 2013/0074133 A1 | 3/2013 | Hwang et al. | |
| 2013/0130216 A1 | 5/2013 | Morton et al. | |
| 2013/0212454 A1 | 8/2013 | Casey | |
| 2013/0257871 A1 | 10/2013 | Goldstein et al. | |
| 2013/0262127 A1 | 10/2013 | Goldstein et al. | |
| 2014/0005814 A1 | 1/2014 | Hwang et al. | |
| 2014/0039887 A1 | 1/2014 | Dzik et al. | |
| 2014/0040713 A1 | 2/2014 | Dzik et al. | |
| 2014/0250219 A1 | 9/2014 | Hwang | |
| 2015/0026577 A1 | 1/2015 | Story et al. | |

FOREIGN PATENT DOCUMENTS

| | | |
|---|---|---|
| EP | 2689346 | 1/2014 |
| JP | 9-265299 | 10/1997 |
| JP | 2002-140085 | 5/2002 |
| JP | 2002-328949 | 11/2002 |
| JP | 2003-304511 | 10/2003 |
| JP | 2004-029324 | 1/2004 |
| JP | 2004-117618 | 4/2004 |
| JP | 2004-266576 | 9/2004 |
| JP | 2005-189454 A | 7/2005 |
| JP | 2007-522591 | 8/2007 |
| JP | 2007-249703 | 9/2007 |
| JP | 2010-250023 | 11/2010 |
| NZ | 532174 | 11/2012 |
| WO | WO 2006/029458 | 3/2006 |
| WO | WO 2011/144617 | 11/2011 |
| WO | WO 2012/129438 | 9/2012 |
| WO | WO 2012/129445 | 9/2012 |
| WO | WO 2013/148724 | 10/2013 |
| WO | WO 2013/169670 | 11/2013 |
| WO | WO 2013/181158 | 12/2013 |
| WO | WO 2013/192050 | 12/2013 |
| WO | WO 2014/004658 | 1/2014 |

OTHER PUBLICATIONS

Beattie, V., et al., Reading Assistant: Technology for Guided Oral Reading, Scientific Learning, Apr. 10, 2012, 5 pages.

Dzik, S.C., U.S. Appl. No. 13/604,482, filed Sep. 5, 2012, entitled Identifying Corresponding Regions of Content.

Dzik, S.C., U.S. Appl. No. 13/604,486, filed Sep. 5, 2012, entitled Selecting Content Portions for Alignment.

Dzik, S.C., U.S. Appl. No. 13/662,306, filed Oct. 26, 2012, entitled Content Presentation Analysis.

Hwang, D.C., et al., U.S. Appl. No. 13/536,711, filed Jun. 28, 2012, entitled Pacing Content.

International Search Report issued in connection with International Patent Application No. PCTUS12/30186 mailed on Jun. 20, 2012, 12 pages.

International Search Report issued in connection with International Patent Application No. PCT/US12/30198 mailed on Jun. 20, 2012, 16 pages.

International Preliminary Report on Patentability issued in connection with International Patent Application No. PCT/US12/30198 mailed on Jan. 30, 2014, 8 pages.

International Search Report and Written Opinion in PCT/US2013/042903 mailed Feb. 7, 2014.

International Search Report issued in connection with International Application No. PCT/US13/53020 mailed on Dec. 16, 2013.

International Search Report and Written Opinion re PCT Application No. PCT/US2014/014508 mailed on Jun. 25, 2014.

Levinson, S.E., et al., Continuous Speech Recognition from a Phonetic Transcription, Acoustics, Speech, and Signal Processing, Apr. 1990, pp. 190-199.

(56) References Cited

OTHER PUBLICATIONS

Vignoli, F., et al., A Text-Speech Synchronization Technique With Applications to Talking Heads, Auditory-Visual Speech Processing, ISCA Archive, Aug. 7-10, 1999.

Weber, F.V., U.S. Appl. No. 13/531,376, filed Jun. 22, 2012, entitled Modelling Expected Errors for Discriminative Training.

Roub, Paul, "I'll Buy an E-book Reader When . . . ", Nov. 16, 2007, available at: http://roub.net/blahg/2007/11/16/ill-buy-an-eboo/ (accessed: Sep. 6, 2012), 2 pages.

Enhanced Editions, "Feature: Synched Audio and Text" Aug. 31, 2009, last accessed Nov. 15, 2012, available at http://www.enhanced-editions.com/blog/2009/08/enhanced-editions-features-exclusive-soundtracks-and-extracts/.

Extended Search Report in European Application No. (12761404.8) dated Jan. 26, 2015.

Office Action in Japanese Application No. 2014-501254 dated Oct. 14, 2014.

Office Action in Japanese Application No. 2014-501257 dated Aug. 25, 2014.

International Preliminary Report on Patentability in PCT/US2013/042903 mailed Dec. 2, 2014.

International Preliminary Report issued in connection with International Application No. PCT/US13/53020 mailed on Feb. 12, 2015.

Office Action in Japanese Application No. 2014-501254 dated May 11, 2015.

Office Action in Canadian Application No. 2830622 dated Jun. 10, 2015.

Extended Search Report in European Application No. 12761104.4 dated Apr. 20, 2015.

Office Action in Canadian Application No. 2830906 dated Mar. 17, 2015.

Office Action in Japanese Application No. 2014-501257 dated Apr. 6, 2015.

International Preliminary Search Report on Patentability in PCT/US2014/014508 mailed Aug. 4, 2015.

* cited by examiner

PROMPTING A USER FOR INPUT DURING A SYNCHRONOUS PRESENTATION OF AUDIO CONTENT AND TEXTUAL CONTENT

BACKGROUND

Generally described, computing devices may facilitate the playback or display of items of content, such as audiobooks, electronic books, songs, videos, television programs, computer and video games, multi-media content, and the like. For example, an electronic book reader computing device ("e-reader") may display an electronic book on a screen and/or play an audiobook through speakers or headphones.

BRIEF DESCRIPTION OF THE DRAWINGS

Various aspects and many of the attendant advantages of the present disclosure will become more readily appreciated as the same become better understood by reference to the following detailed description when taken in conjunction with the accompanying drawings, wherein.

DETAILED DESCRIPTION

Figure 1:
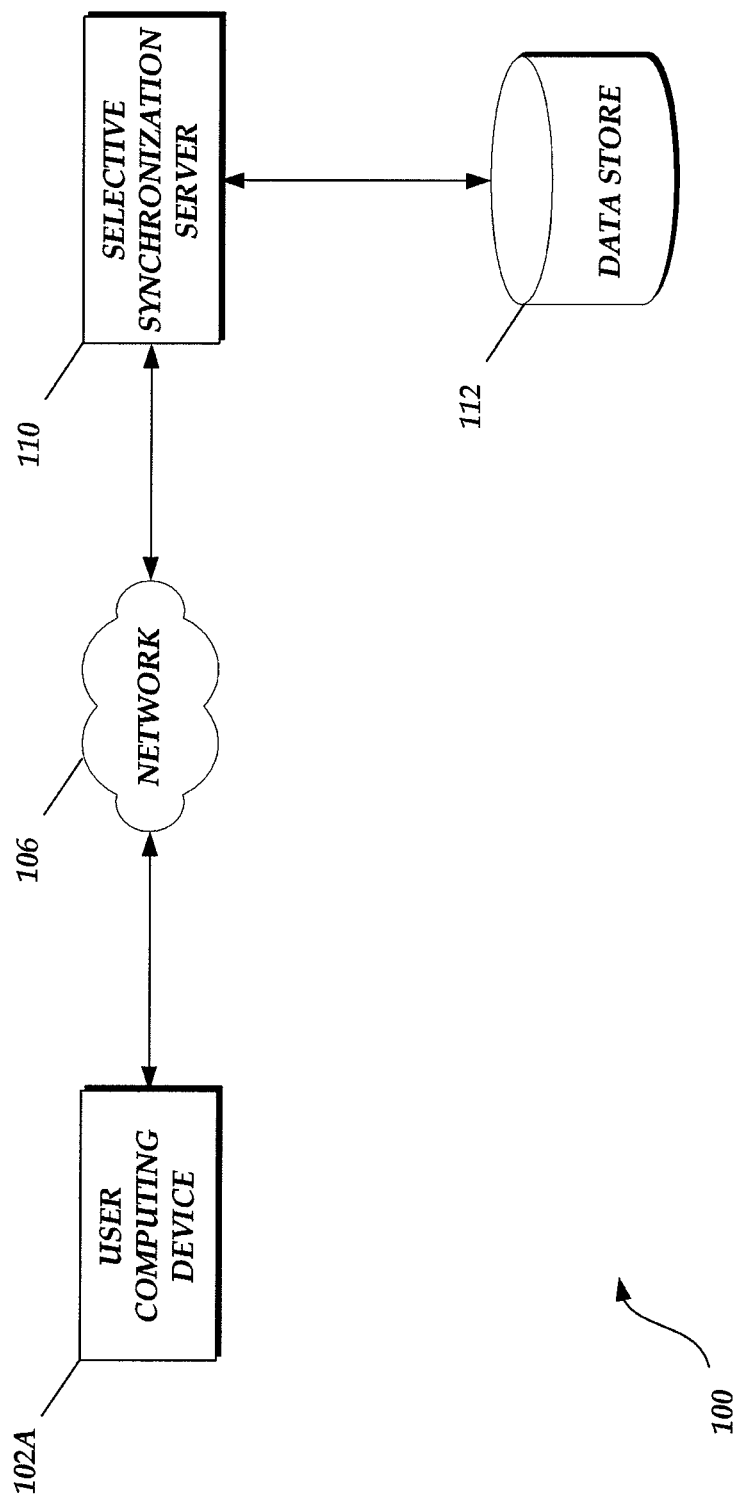
FIG. 1 is a block diagram depicting an illustrative network environment in which a selective synchronization service may operate.

Computing devices may be configured to present multiple items of content in different media. For example, a user may use his or her user computing device to read an electronic book while listening to an audiobook of the same title, such as *The Adventures of Tom Sawyer*. The electronic book and the audiobook (or more generally, any group of two or more items of content related to the same content title) may be referred to as "companion" items of content. In some approaches, the electronic book and the audiobook can be presented synchronously, such that as a word in the electronic book is textually presented substantially while a word in the audiobook is audibly presented (e.g., spoken by the narrator of the audiobook). Content synchronization information that indicates a corresponding presentation position for a corresponding word may be provided to facilitate the synchronous presentation of the companion items of content. Further information pertaining to the synchronization of companion items of content can be found in U.S. patent application Ser. No. 13/604,482, entitled "IDENTIFYING CORRESPONDING REGIONS OF CONTENT" and filed on Sep. 5, 2012; in U.S. patent application Ser. No. 13/604,486, entitled "SELECTING CONTENT PORTIONS FOR ALIGNMENT" and filed on Sep. 5, 2012; U.S. patent application Ser. No. 13/070,313, entitled "SYNCHRONIZING DIGITAL CONTENT" and filed on Mar. 23, 2011; and in U.S. patent application Ser. No. 12/273,473, entitled "SYNCHRONIZATION OF DIGITAL CONTENT" and filed on Nov. 18, 2008. The disclosures of all four of these applications are hereby incorporated by reference in their entireties.

Generally described, aspects of the present disclosure relate to the selective or modified synchronous presentation of an item of audio content (such as an audiobook) with a companion item of textual content (such as an electronic book). Accordingly, a selective synchronization service is disclosed. In one embodiment, one or more corresponding words are identified in an item of textual content and an item of audio content. As used herein, a "corresponding word" may refer to a word that is audibly presented in an item of audio content at a presentation position that corresponds with a presentation position in an item of textual content at which the word is textually presented. One or more of the corresponding words may be selected for synchronous presentation and presented both audibly and textually by a computing device, while other corresponding words may be selected for either a textual presentation without an audible presentation (e.g., by muting the audio of the corresponding word or otherwise causing audio of the corresponding word not to be presented) or an audible presentation without a textual presentation (e.g., by not displaying the word or otherwise causing the corresponding word not to be presented in the text).

Corresponding words may be selected for synchronous audible and textual presentation according to any of a number of criteria. In some embodiments, the words selected for synchronous audible and textual presentation have a number of letters or syllables that satisfy a threshold. Advantageously, a user looking to improve his or her pronunciation or comprehension of relatively longer and more difficult words may hear those words audibly presented substantially while reading those words as they are textually presented. Relatively easy words (such as short words, or words that do not have a threshold number of letters or syllables), by contrast, may be presented textually without necessarily being presented audibly, as the user is likely to know how to pronounce or understand such easy words without further assistance.

Many variations on the synchronous presentation of textual content and audio content are possible. For example, a modification may be made to a textual presentation of the corresponding word, such that the corresponding word is highlighted, blanked out, or presented at a different presentation position in the text (e.g., out of order). The modification to the presentation of the corresponding word may also include making a substitution for the corresponding word in the text. For example, the corresponding word may be replaced with a homophone of the corresponding word, misspelling of the corresponding word, incorrect grammatical case of the corresponding word, incorrect singular or plural form, of the corresponding word and the like.

A modification may also be made to an audible presentation of the corresponding word. As discussed above, this modification may include muting the audible presentation of the corresponding word. Other possible modifications include presenting the corresponding word at a different presentation rate than the rest of the audio content (e.g., slowing down or speeding up the audible presentation for the corresponding word); presenting the corresponding word one phoneme or syllable at a time (e.g., to help the user learn how to "sound out" the word); or presenting the corresponding word with an incorrect pronunciation (e.g., by substituting one or more phonemes or by altering the inflection of the audible presentation of the corresponding word).

In some embodiments, a computing device presenting the content may obtain user input responsive to the audible and textual presentation of the item of audio content and item of textual content. For example, the computing device may prompt the user to speak the corresponding word; spell the corresponding word (e.g., by speaking each letter out loud, typing in the word, etc.); provide input responsive to an incorrect form of a corresponding word; and so forth. The computing device may be configured to determine whether the user input constitutes an appropriate response (e.g., a correctly spelled or pronounced word). If the response is not an appropriate response, the computing device may optionally provide a hint to the user. Further, in some embodiments, the computing device may only synchronously present a subsequent corresponding word if the user provides a response. For example, the computing device may prompt for a user response every number of words (e.g., every ten words, once a paragraph, etc.), which may advantageously ensure that the user is paying attention to the synchronous presentation.

It will be appreciated that the selective synchronization service may operate on many different types of content. Generally described, content can refer to any data that can be directly or indirectly accessed by a user, including, but not limited to audiobooks, electronic books, songs, videos, television programs, computer and video games, multi-media content, digital images, digital video, displayable text, audio data, electronic documents, computer-executable code, blocks or portions of the above and the like. Accordingly, "item of textual content" may generally refer to any electronic item of content that includes text. Likewise, "item of audio content" may generally refer to any electronic item of content that includes audio content.

Turning to FIG. 1, an illustrative network environment 100 is shown. The network environment 100 may include a user computing device 102, a network 106, a selective synchronization server 110 and a data store 112. The constituents of the network environment 100 may be in communication with each other either locally or over the network 106.

The user computing device 102 may be any computing device capable of communicating over the network 106, such as a laptop or tablet computer, personal computer, personal digital assistant (PDA), hybrid PDA/mobile phone, mobile phone, electronic book reader, set-top box, camera, audiobook player, digital media player, video game console, in-store kiosk, television, one or more processors, integrated components for inclusion in computing devices, appliances, electronic devices for inclusion in vehicles or machinery, gaming devices, or the like. The user computing device 102 may generally be capable of presenting content to a user of the user computing device 102. For example, the user computing device 102 may be capable of playing audio content by directing audible output through speakers, headphones, or the like. The user computing device 102 may also be capable of displaying textual content, graphical content, or video content on a display screen.

In some embodiments, the user computing device 102 may also be configured to present textual content and companion audio or video content in a synchronized manner. The user computing device 102 may also be capable of communicating over the network 106, for example, to obtain content synchronization information from the selective synchronization server 110. In some embodiments, the user computing device 102 may include non-transitory computer-readable medium storage for storing content synchronization information and items of content, such as electronic books and audiobooks.

The selective synchronization server 110 is a computing device that may perform a variety of tasks to implement the selective synchronization service. For example, the selective synchronization server 110 may align an item of audio content (e.g., an audiobook) and an item of textual content (e.g., an electronic book) and generate content synchronization information that indicates one or more corresponding words in the item of audio content and the item of textual content. The selective synchronization server 110 may also select which corresponding words are to be synchronously presented and which corresponding words are to be presented in a modified manner, which selections may also be included in the content synchronization information. This content synchronization information may be provided by the selective synchronization server 110 to a user computing device 102 over the network 106, or stored in the data store 112. Additional operations of the selective synchronization server 110 are described in further detail with respect to FIG. 2.

The user computing device 102 and selective synchronization server 110 may each be embodied in a plurality of components, each executing an instance of the respective content user computing device 102 and selective synchronization server 110. A server or other computing system implementing the user computing device 102 and selective synchronization server 110 may include a network interface, memory, processing unit and computer readable medium drive, all of which may communicate with each other by way of a communication bus. Moreover, a processing unit may itself be referred to as a computing device. The network interface may provide connectivity over the network 106 and/or other networks or computer systems. The processing unit may communicate to and from memory containing program instructions that the processing unit executes in order to operate the user computing device 102 and selective synchronization server 110. The memory generally includes RAM, ROM and/or other persistent and/or auxiliary non-transitory computer-readable storage media.

The selective synchronization server 110 may be in communication with a data store 112. The data store 112 may electronically store items of audio content and/or textual content, such as audiobooks, musical works, electronic books, television programs, video clips, movies, multimedia content, video games and other types of content. The data store 112 may additionally store content synchronization information and/or criteria for selecting words for synchronous or modified synchronous presentation. Selection criteria are discussed further below with respect to FIG. 3A and FIG. 3B.

The data store 112 may be embodied in hard disk drives, solid state memories and/or any other type of non-transitory computer-readable storage medium accessible to the selective synchronization server 110. The data store 112 may also be distributed or partitioned across multiple local and/or remote storage devices as is known in the art without departing from the scope of the present disclosure. In yet other embodiments, the data store 112 includes a data storage web service.

It will be recognized that many of the devices described herein are optional and that embodiments of the environment 100 may or may not combine devices. Furthermore, devices need not be distinct or discrete. Devices may also be reorganized in the environment 100. For example, the selective synchronization server 110 may be represented in a single physical server or, alternatively, may be split into multiple physical servers. The entire selective synchronization service may be represented in a single user computing device 102 as well.

Additionally, it should be noted that in some embodiments, the selective synchronization service is executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 2:
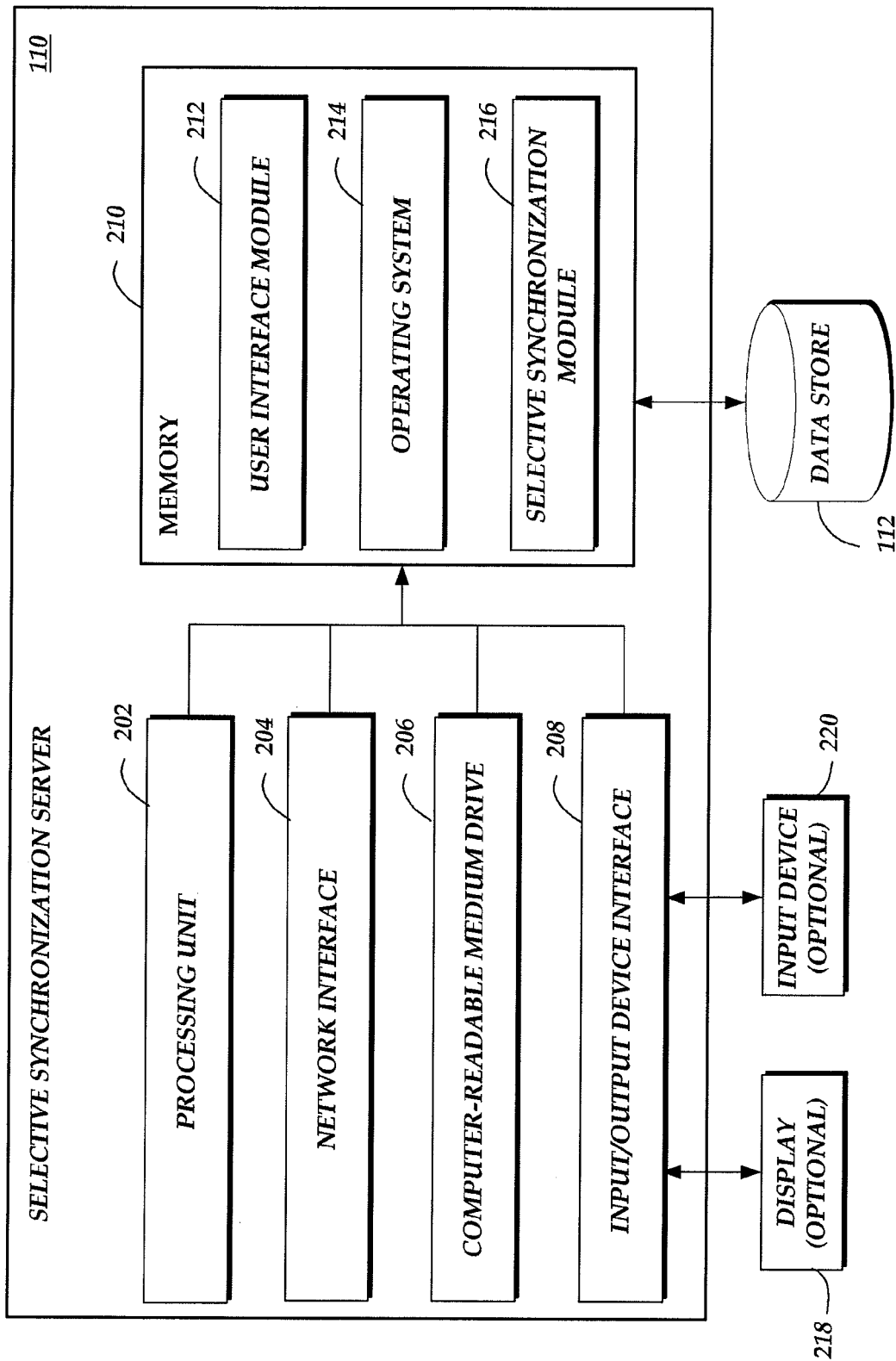
FIG. 2 is a schematic diagram depicting an illustrative selective synchronization server.

FIG. 2 is a schematic diagram of the selective synchronization server 110 shown in FIG. 1. The selective synchronization server 110 includes an arrangement of computer hardware and software components that may be used to implement the selective synchronization service. FIG. 2 depicts a general architecture of the selective synchronization server 110 illustrated in FIG. 1. The selective synchronization server 110 may include more (or fewer) components than those shown in FIG. 2. It is not necessary, however, that all of these generally conventional components be shown in order to provide an enabling disclosure.

The selective synchronization server 110 includes a processing unit 202, a network interface 204, a non-transitory computer-readable medium drive 206 and an input/output device interface 208, all of which may communicate with one another by way of a communication bus. As illustrated, the selective synchronization server 110 is optionally associated with, or in communication with, an optional display 218 and an optional input device 220. The display 218 and input device 220 may be used in embodiments in which users interact directly with the selective synchronization server 110, such as an integrated in-store kiosk, for example. In other embodiments, the display 218 and input device 220 may be included in a user computing device 102 shown in FIG. 1. The network interface 204 may provide the selective synchronization server 110 with connectivity to one or more networks or computing systems. The processing unit 202 may thus receive information and instructions from other computing systems (such as the user computing device 102) or services via a network. The processing unit 202 may also communicate to and from memory 210 and further provide output information for an optional display 218 via the input/output device interface 208. The input/output device interface 208 may accept input from the optional input device 220, such as a keyboard, mouse, digital pen, touch screen, or gestures recorded via motion capture. The input/output device interface 220 may also output audio data to speakers or headphones (not shown).

The memory 210 contains computer program instructions that the processing unit 202 executes in order to implement one or more embodiments of the selective synchronization service. The memory 210 generally includes RAM, ROM and/or other persistent or non-transitory computer-readable storage media. The memory 210 may store an operating system 214 that provides computer program instructions for use by the processing unit 202 in the general administration and operation of the selective synchronization server 110. The memory 210 may further include other information for implementing aspects of the selective synchronization service. For example, in one embodiment, the memory 210 includes a user interface module 212 that facilitates generation of user interfaces (such as by providing instructions therefor) for display upon a computing device such as user computing device 102. The user interface may be displayed via a navigation interface such as a web browser installed on the user computing device 102. In addition, memory 210 may include or communicate with the data store 112. Content stored in the data store 112 may include items of textual content and items of audio content, as described in FIG. 1.

In addition to the user interface module 212, the memory 210 may include a selective synchronization module 216 that may be executed by the processing unit 202. In one embodiment, the selective synchronization module 216 may be used to implement the selective synchronization service, example operations of which are discussed below with respect to FIG. 3A, FIG. 3B, FIG. 4A and FIG. 4B.

In some embodiments, the selective synchronization service is implemented partially or entirely by the user computing device 102. Accordingly, the user computing device 102 may include a selective synchronization module 216 and other components that operate similarly to the components illustrated as part of the selective synchronization server 110, including a processing unit 202, network interface 204, non-transitory computer-readable medium drive 206, input/output interface 208, memory 210, user interface module 212 and so forth.

Figure 3A:
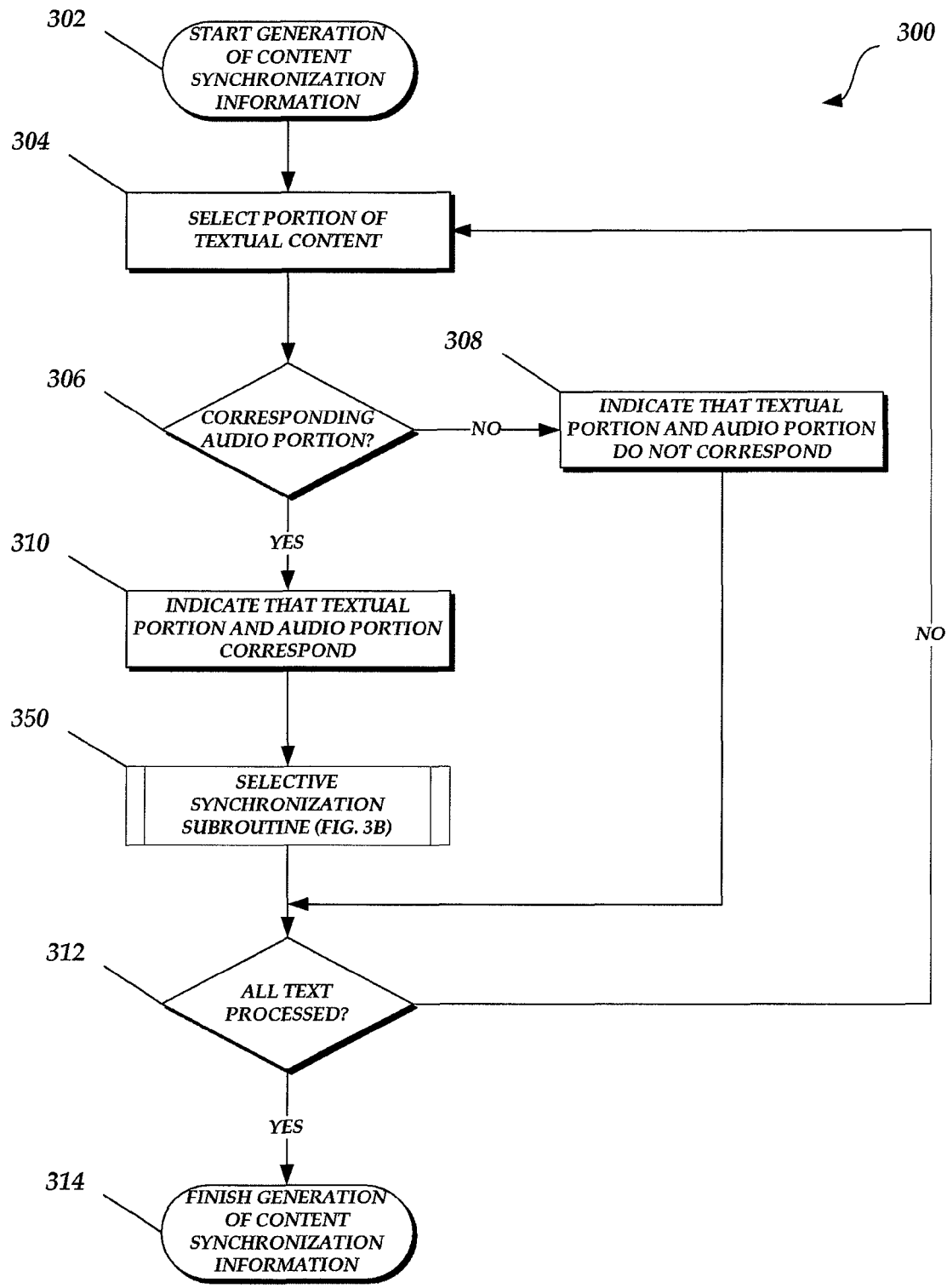
FIG. 3A is a flow diagram depicting an illustrative routine for generating content synchronization information to facilitate the synchronous presentation of audio content and textual content.

Turning now to FIG. 3A, an illustrative routine 300 for generating content synchronization information is shown. The illustrative routine 300 may be implemented by the user computing device 102, the selective synchronization server 110, or both. The content synchronization information may identify a corresponding presentation position at which a corresponding word is presented in both the item of textual content and the item of audio content. The content synchronization information may also direct a computing device to present corresponding words of the companion items of content synchronously and to cease synchronous presentation for mismatched words of the companion items of content. The content synchronization information may further direct the computing device make modifications to the synchronous presentation as discussed above.

In one example of how content synchronization information facilitates the synchronous presentation of companion items of audio content and textual content, the content synchronization information may direct a user computing device 102 to synchronously present one or more corresponding words that are audibly presented in an item of audio content and textually presented in a companion item of textual content. Thus, the audio content may follow a user's progress in the textual content, so that the words spoken in the audio content line up with the words read by the user in the textual content. Optionally, the words in the textual content may be highlighted (or otherwise visually indicated) as they are spoken in the audio content to assist the user in following the presentation.

The illustrative routine 300 begins at block 302. At block 304, a portion of the item of textual content may be selected. Generally described, a portion of the textual content may include a word, phrase, sentence, paragraph, etc. Portions corresponding to words, phrases, or sentences, may be identified using techniques such as statistical language models, finite grammars, optical character recognition to identify spaces (between words, sentences, paragraphs, etc.), or other techniques. In examples pertaining to the English language and many other languages, a word may be bounded by spaces on either side; a phrase may be bounded by punctuation, prepositions, conjunctions, or changes in word type (e.g., noun to verb indicating a change from subject to predicate); and sentences may be bounded at the beginning by a capital letter and at the end by a period, exclamation point, question mark, or the like.

At block 306, the illustrative routine 300 may determine whether the item of audio content includes a portion that corresponds to the portion of the textual content selected in block 304. In some embodiments, these portions correspond if the portion of the textual content includes at least a threshold percentage of words that correspond to words included in a portion of the audio content to which it is compared, as might be determined by comparing the portion of the textual content with a transcription of the portion of the audio content. This threshold percentage may be 50% corresponding words; 70% corresponding words; 95% corresponding words; or any other threshold percentage.

If the portions do not correspond, the illustrative routine 300 may proceed to block 308 and indicate in the content synchronization information that the textual content does not correspond to the audio content. Accordingly, in some embodiments, while the mismatched portion of the item of textual content is presented on a computing device provided with the content synchronization information, no audio content is presented by the computing device. The illustrative routine 300 may then proceed directly to block 312.

If the portion of the item of textual content does correspond to a portion of the item of audio content, the illustrative routine 300 may proceed to block 310 and indicate in the content synchronization information being generated that the portions correspond. Accordingly, in some embodiments, corresponding words present in the portion of the item of textual content and in the portion of the item of audio content may be selected for synchronous presentation or for a modification to their synchronous presentation. The illustrative routine 300 may proceed to block 350 to process each corresponding word.

Figure 3B:
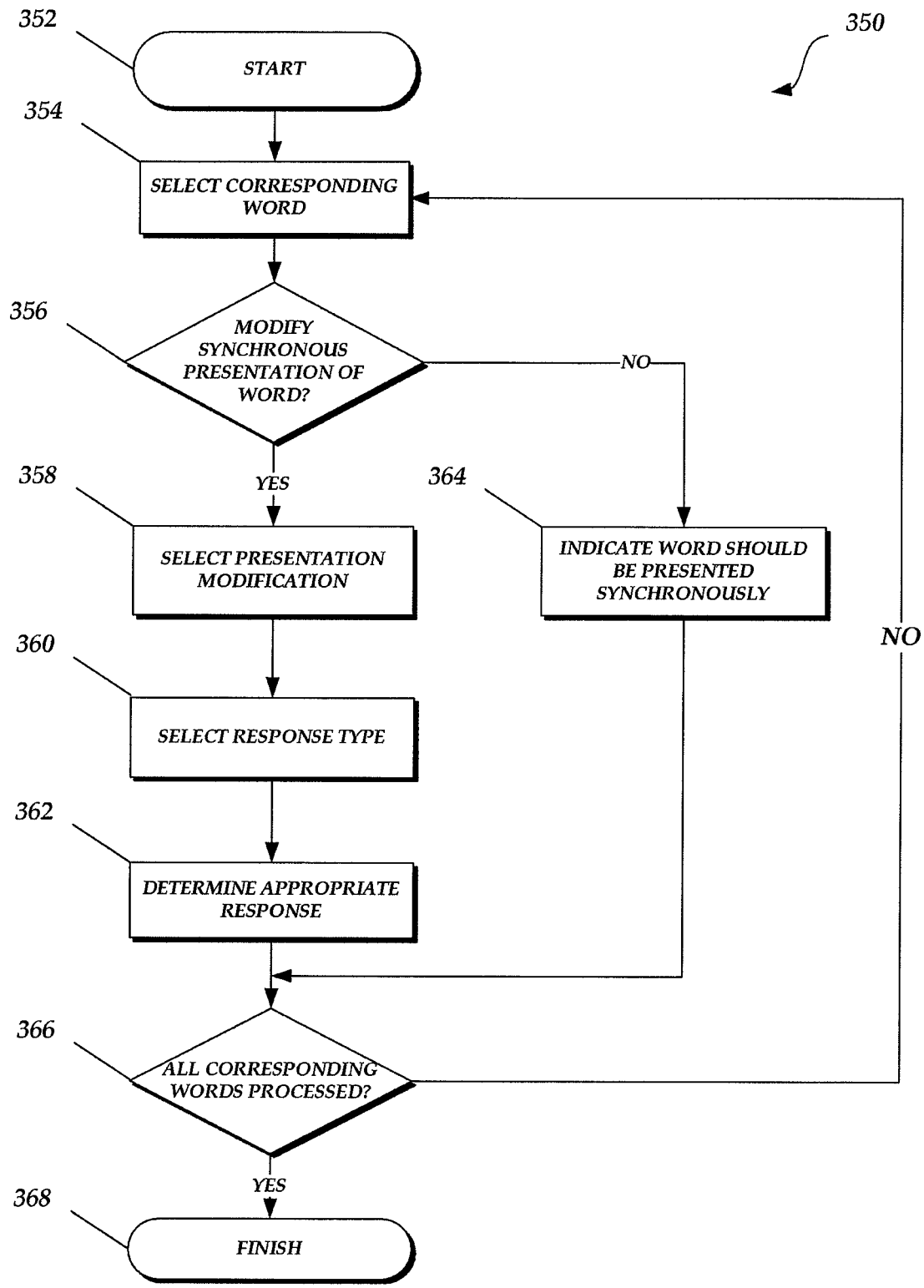
FIG. 3B is a flow diagram depicting an illustrative subroutine for providing modifications to the synchronous presentation of audio content and textual content.

Turning now to FIG. 3B, an illustrative subroutine 350 for selective synchronization is shown. The illustrative routine 350 starts at block 352. At block 354, the illustrative subroutine 350 selects a corresponding word that is present in both the portion of the item of textual content and in the portion of the item of audio content, as may be determined in block 304 of the illustrative routine 300.

At block 356, the illustrative subroutine 350 determines whether to modify the synchronous presentation of the corresponding word. A number of criteria may be applied to determine whether an audible or textual presentation of the corresponding word should be modified, or whether the corresponding word should be synchronously presented both audibly and textually. In some embodiments, a corresponding word is selected (or not selected) for a presentation modification if it includes a number of letters or syllables satisfying a threshold. In other embodiments, a corresponding word is selected (or not selected) for a presentation modification if it is a loanword from a language other than a language with which the item of content is associated (e.g., a language in which the item of content is primarily presented). In yet other embodiments, a corresponding word is selected (or not selected) for a presentation modification if it is included on a vocabulary list provided to the selective synchronization service. In still other embodiments, a corresponding word is selected (or not selected) for a presentation modification if it does not obey regular pronunciation rules for a language associated with the items of companion content (e.g., the word "colonel" for items of content associated with the English language). In further embodiments, a corresponding word is selected (or not selected) for a presentation modification if it has a particular part of speech (noun, verb, adverb, adjective, preposition, pronoun, etc.). In yet further embodiments, a corresponding word is selected (or not selected) for a presentation modification based on whether a previous corresponding word has been selected (or not selected) for a presentation modification. For example, a presentation modification may be provided for every other corresponding word, for every ten corresponding words, or for one corresponding word per sentence or paragraph, among other examples. Further criteria for selecting (or not selecting) corresponding words for a presentation modification may be applied. Additionally, user input (either from the user to whom the content is to be presented, or from a different user) may be obtained to determine whether the corresponding word should be presented in a synchronous or modified manner.

If the illustrative subroutine 350 determines at block 356 that the synchronous presentation of the corresponding word is to be modified, the illustrative subroutine may proceed to block 358 to select a presentation modification to be indicated in the content synchronization information. The presentation modification may include a modification to the textual presentation of the corresponding word; a modification to the audible presentation of the corresponding word; or a modification to both the textual presentation and the audible presentation of the corresponding word. Further, multiple modifications may be selected for a single corresponding word.

Many modifications to the audible presentation of the corresponding word are possible. In some embodiments, the audible presentation of the corresponding word is modified by altering the volume of the corresponding word, which may include muting or otherwise decreasing the volume of the corresponding word, or may include increasing the volume of the corresponding word. In other embodiments, the audible presentation of the corresponding word is modified by presenting the corresponding word at a presentation rate that is faster or slower than the presentation rate (e.g., playback speed) at which the item of audio content is typically presented. In still other embodiments, the corresponding word may be broken down into fragments such as phonemes or syllables and each phoneme or syllable may be separately audibly presented responsive to user input (e.g., the user speaking the phoneme syllable). In yet further embodiments, the audible presentation of the corresponding word is modified by causing a mispronunciation of the corresponding word to be audibly presented. Still other modifications to the audible presentation of the corresponding word are possible.

Likewise, many modifications to the textual presentation of the corresponding word are also possible. In some embodiments, the textual presentation of the corresponding word is modified by replacing the corresponding word with a blank in the text. In other embodiments, the textual presentation of the corresponding word is modified by replacing the corresponding word with a homophone of the corresponding word; an incorrect grammatical case of the corresponding word; or a misspelling of the corresponding word. In still further embodiments, the textual presentation of the corresponding word is modified by placing the corresponding word out of order in the text (e.g., altering the presentation position in the text of the corresponding word). In yet further embodiments, the textual presentation of the corresponding word is modified by highlighting or otherwise indicating the corresponding word, which highlighting or indicating may differ from any highlighting or indicating provided by an unmodified synchronous presentation. Still other modifications to the textual presentation of the corresponding word are possible.

At block 360, the illustrative subroutine 350 may optionally select a response type for the presentation modification. A user may be prompted to provide a response to the presentation modification if a response type is selected. The selected response type may vary based on the presentation modification selected in block 358. Specific, non-limiting examples of presentation modifications and their associated response types are shown below in Table 1:

TABLE 1

| Selected Modification (Block 358) | Selected Response Type (Block 360) |
|---|---|
| Corresponding word replaced with blank in text or with misspelling in text | User response includes spelling corresponding word (speaking each letter or typing in word) |
| Corresponding word replaced with homophone in text | User response includes spelling corresponding word or selecting corresponding word from list that also includes homophone |
| Corresponding word replaced with wrong grammatical case in text | User response includes spelling corresponding word or selecting correct grammatical case of corresponding word from list that also includes one or more wrong grammatical cases |
| Corresponding word presented in text at incorrect presentation position (word order) | User response includes indicating correct presentation position of corresponding word (word order) |
| Corresponding word muted in audio or replaced with mispronunciation in audio | User response includes speaking word |
| Corresponding word presented phoneme-by-phoneme or syllable-by-syllable in audio | User response includes speaking each phoneme or syllable before next phoneme or syllable is audibly presented |
| Corresponding word replaced with blank in text and muted in audio | User response includes doze exercise response (typed or spoken word) |

At block 362, the illustrative routine 350 may determine an appropriate response that corresponds to the response type selected in block 360 for the presentation modification selected in block 358. Responses may be provided by a user via his or her user computing device 102 (e.g., by speaking to an audio input device provided with the user computing device 102, by typing in a response on a keyboard provided with the user computing device 102, by interacting with a touchscreen or mouse provided with the user computing device 102, etc.). Non-limiting examples of appropriate responses are shown below in Table 2.

TABLE 2

| Selected Modification (Block 358) | Selected Response Type (Block 360) | Appropriate Response (Block 362) |
|---|---|---|
| Corresponding word replaced with blank in text or with misspelling in text | User response includes spelling word (speaking each letter or typing in word) | Correctly spelled corresponding word |
| Corresponding word replaced with homophone in text | User response includes spelling corresponding word or selecting corresponding word from list that also includes homophone | Correctly spelled corresponding word or correctly selected corresponding word |
| Corresponding word replaced with wrong grammatical case in text | User response includes spelling corresponding word or selecting correct grammatical case of corresponding word from list that also includes one or more wrong grammatical cases | Correctly spelled corresponding word or correctly selected grammatical case of corresponding word |
| Corresponding word presented in text at incorrect presentation position (word order) | User response includes indicating correct presentation position of corresponding word (word order) | Correct presentation position of corresponding word (as may be indicated by the user "dragging" the corresponding word to the correct presentation position) |
| Corresponding word muted in audio or replaced with mispronunciation in audio | User response includes speaking word | Correctly pronounced corresponding word |
| Corresponding word presented phoneme-by-phoneme or syllable-by-syllable in audio | User response includes speaking each phoneme or syllable before next phoneme or syllable is audibly presented | Correctly pronounced phoneme or syllable |
| Corresponding word replaced with blank in text and muted in audio | User response includes doze exercise response (typed or spoken word) | Corresponding word or synonym for corresponding word |

After determining an appropriate response at block 362, the illustrative subroutine 350 may proceed to block 366, which will be described below.

Returning to block 356, if the illustrative subroutine 350 does not determine that the synchronous presentation of the corresponding word should be modified, the illustrative subroutine 350 may proceed to block 364 and indicate in the content synchronization information being generated that the corresponding word should be presented synchronously and without modification. The illustrative subroutine 350 may then proceed directly to block 366.

At block 366, the illustrative subroutine 350 may determine if all corresponding words have been processed. If not, the illustrative subroutine 350 may return to block 354 and select another corresponding word to process. If all corresponding words present in both the portion of the item of textual content and in the portion of the item of audio content have been processed, the illustrative subroutine 350 finishes at block 368.

It should be noted that the illustrative subroutine 350 defaults to indicating in the content synchronization information that a corresponding word should be presented both audibly and textually if no modification is selected. However, in other embodiments, the illustrative subroutine 350 defaults to indicating content synchronization information that a corresponding word should be presented only textually or only audibly. In such embodiments, certain corresponding words may be selected for synchronous audible and textual presentation, while other corresponding words are selected to be presented only audibly or only textually. These selections of corresponding words for synchronous presentation may generally be made according to criteria generally similar to that used to select words for presentation modifications as discussed above with respect to block 356.

Returning to FIG. 3A, upon completion of the illustrative subroutine 350, the illustrative routine 300 may proceed to block 312. At block 312, the illustrative routine 300 may determine whether all portions of textual content have been processed for purposes of generating content synchronization information. If not, the illustrative routine 300 returns to block 304. On the other hand, if all portions of textual content have been processed, the illustrative routine 300 finishes the generation of the content synchronization information in block 314.

Accordingly, the generated content synchronization information may include information indicating whether one, some, or all portions of the item of textual content correspond to a portion of the audio content. This generated content synchronization information may be used to facilitate the synchronous presentation of corresponding words present in the item of audio content and in the item of textual content. Likewise, the content synchronization information may include information pertaining to modifications to be made to the synchronous presentation.

Further information pertaining to the generation of content synchronization information may be found in may be found in U.S. patent application Ser. No. 13/604,482, entitled "IDENTIFYING CORRESPONDING REGIONS OF CONTENT" and filed on Sep. 5, 2012; in U.S. patent application Ser. No. 13/604,486, entitled "SELECTING CONTENT PORTIONS FOR ALIGNMENT" and filed on Sep. 5, 2012; U.S. patent application Ser. No. 13/070,313. The disclosures of both of these applications were previously incorporated by reference in their entireties above.

Based on the foregoing, a number of implementations of the selective synchronization service for specific use cases are possible, non-limiting examples of which are discussed herein. In one use case, synchronous audible and textual presentation is provided only for corresponding words that have a number of letters or a number of syllables that satisfies a threshold, while the audible presentation is muted for corresponding words that do not have a number of letters or a number of syllables that satisfies a threshold. Advantageously, a user may hear relatively difficult words presented audibly in conjunction with the text, so as to improve his or her pronunciation or reading skills. In another use case, synchronous audible and textual presentation is provided only for corresponding words that are loanwords from a language other than a language with which the companion items of content are associated, while the audible presentation is muted for corresponding words in the primary language of the companion items of content. For example, if the items of companion content are associated with the English language, a corresponding loanword associated with the French language (such as "champagne" or "coterie") may be presented both audibly and textually, while corresponding words associated with the English language may only be presented textually. Still further use cases are possible.

Figure 4A:
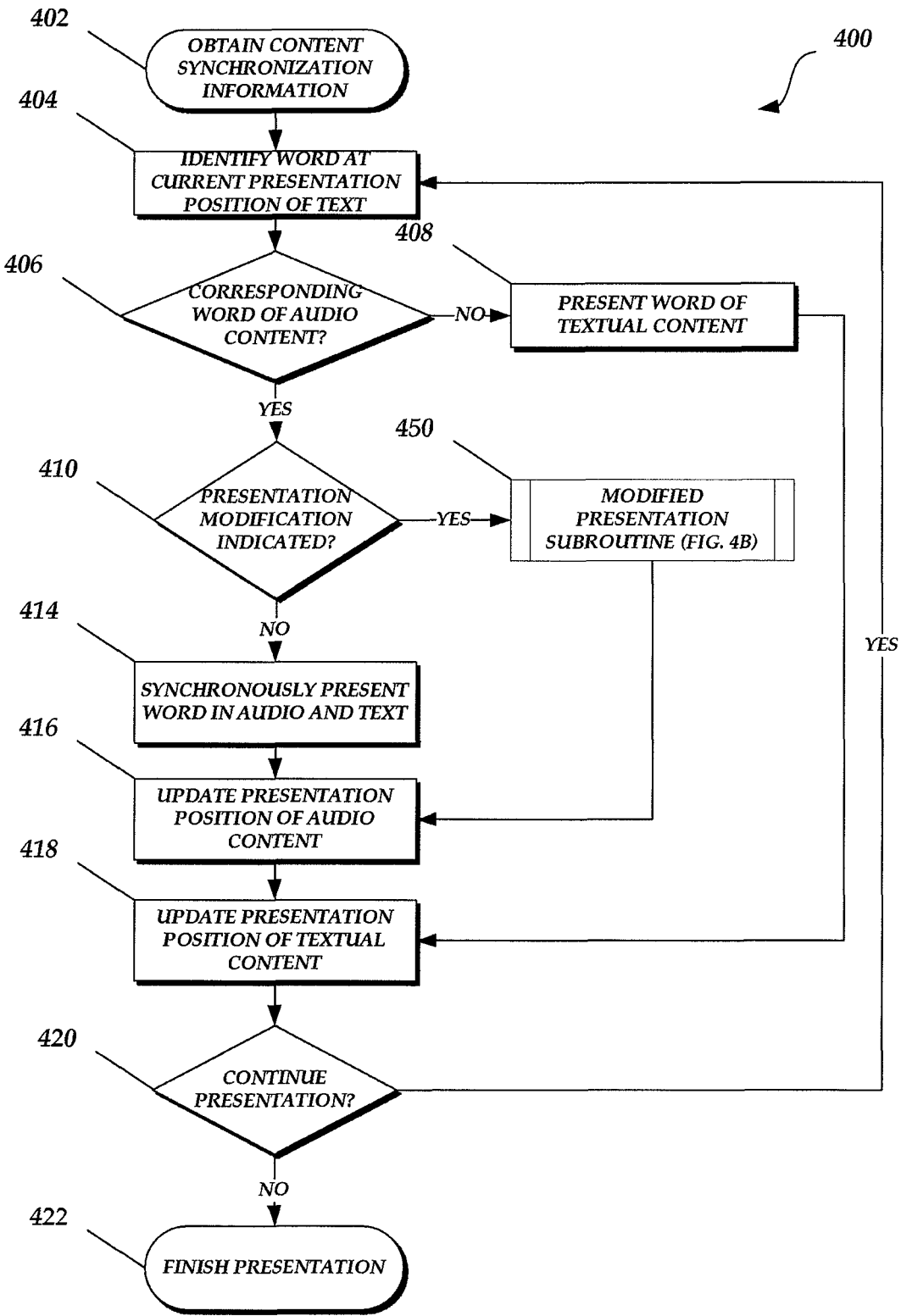
FIG. 4A is a flow diagram depicting an illustrative routine for synchronously presenting audio content and textual content.

Turning now to FIG. 4A, an illustrative routine 400 is shown for presenting companion items of audio and textual content according to the principles of the present disclosure. In some embodiments, the illustrative routine 400 is implemented by a user computing device 102 to cause presentation of the companion items of content.

At block 402, the illustrative routine 400 may obtain content synchronization information. For example, a user computing device 102 may obtain the content synchronization information from the selective synchronization server 110. Alternatively or additionally, the content synchronization information may be obtained by a user computing device 102 configured to generate content synchronization information. An illustrative routine 300 for generating content synchronization information is described above with respect to FIG. 3A.

As previously described, the content synchronization information can include information regarding positions in the item of textual content that correspond to positions in the item of content comprising audio content (e.g., a page and line in an electronic book and a playback position of an audiobook), additional information related to synchronous presentation (e.g., information for highlighting, underlining, etc. or otherwise indicating a portion of an electronic book that corresponds to the playback of an audiobook), information identifying portions of the textual content and audio content that correspond or fail to correspond, or any combination thereof.

At block 404, the illustrative routine 400 may identify a word at the current presentation position in the text. The presentation position of the text may be measured on a word-by-word basis, page-by-page basis, or by any other metric.

At block 406, the illustrative routine 400 may determine whether the word at the current presentation position of the text corresponds to a word in the audio content, as may be indicated by the content synchronization information.

If the word at the current presentation position of the text does not correspond to a word in the audio content, the word of the textual content may be presented in block 408. It should be appreciated that textual content may be presented in several ways, including visually (e.g., as text on a screen) or tactilely (e.g., via mechanical vibrations and/or by presenting Braille), or a combination thereof. As discussed above, an item of textual content may be any electronic item of content that includes text, such as electronic books, periodicals, scripts, librettos and the like, or blocks or portions thereof. The illustrative routine 400 may then proceed to block 418.

If the word at the current presentation position of the text does corresponding to a word of the audio content, the illustrative routine 400 may proceed to block 410 and determine whether a presentation modification is indicated in the content synchronization information for the corresponding word.

If no presentation modification is indicated, the illustrative routine 400 may cause a synchronous audible and textual presentation of the corresponding word at block 414. As the audio of the corresponding word is presented, the presentation position of the audio (as might be measured by a timestamp or other metric) may be updated at block 416. The illustrative routine 400 may then proceed to block 418.

Figure 4B:
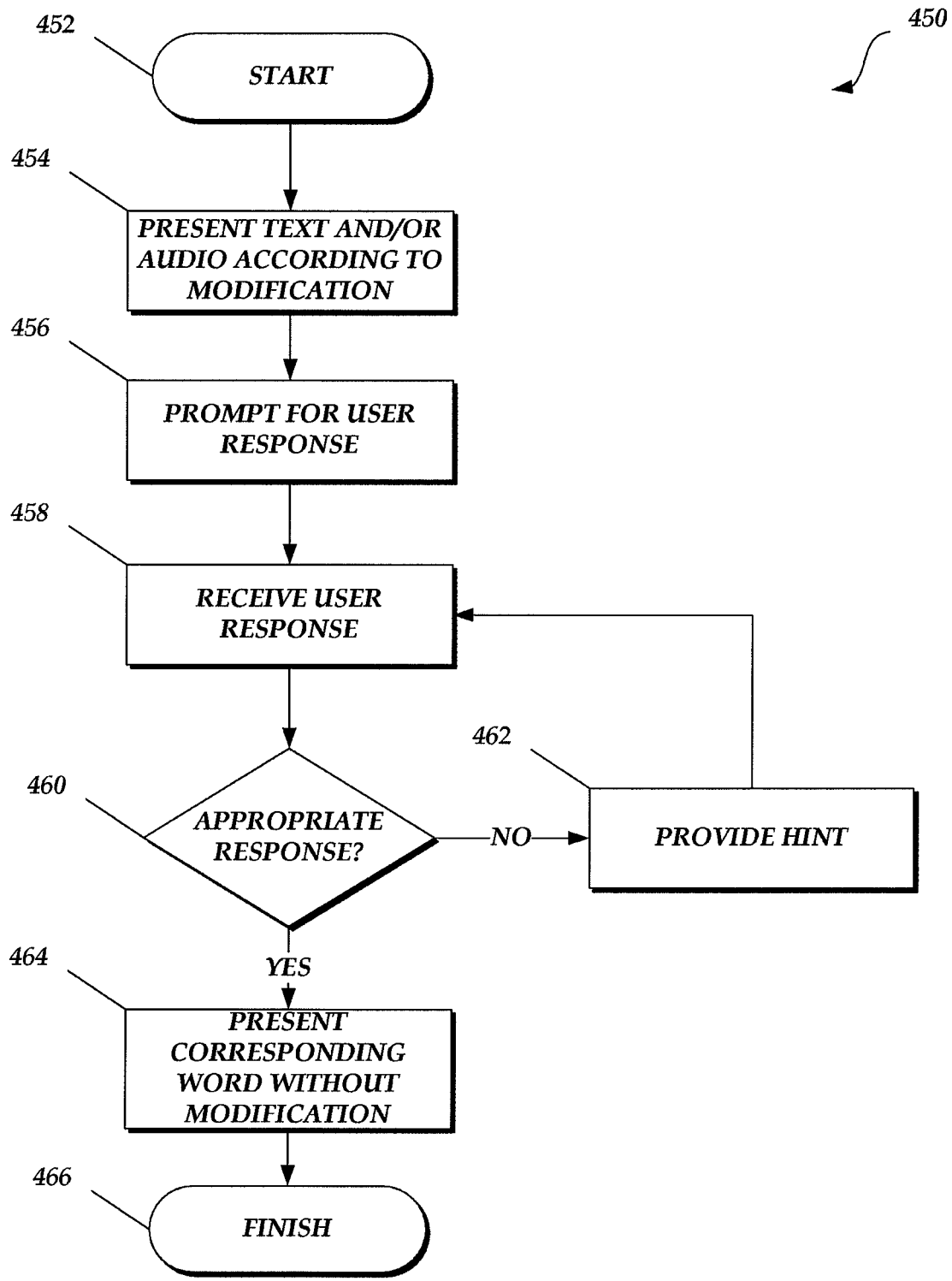
FIG. 4B is a flow diagram depicting an illustrative subroutine for the modified synchronous presentation of audio content and textual content.

If a presentation modification is indicated, the illustrative routine 400 may proceed to implement an illustrative modified presentation subroutine 450. Turning now to FIG. 4B, the illustrative subroutine 450 may begin at block 452. At block 454, the illustrative subroutine 450 may cause a modified textual or audible presentation of the corresponding word.

If the content synchronization information indicates that the user is to provide a response to the modification, at block 456, the illustrative subroutine 450 may prompt the user for a response to the modification. A prompt may be provided to the user in several ways via the user computing device 102. In some embodiments, the user computing device 102 audibly conveys the prompt. For example, a speech synthesizer may be used to generate an audio prompt to be played back to the user through speakers or headphones. In other embodiments, the user computing device 102 presents the prompt as visual content on a display screen. For example, the prompt may be posed as text, an image, a video clip, an animation, or in some other visual format. Still other ways to present the prompt are possible.

At block 458, the illustrative subroutine 450 may receive the user's response via a user computing device 102 or other computing device implementing the illustrative subroutine 450. In some embodiments, the user may interact with an input device associated with the user computing device 102 to provide a response. The user may direct input through a mouse, keyboard, touchscreen, or other input device to interact with a user interface configured to receive the user's response. For example, the selective synchronization service may display on a touchscreen the prompt and one or more software controls indicating response choices to the prompt (e.g., a list of possible responses). The user may tap one of the software controls to indicate his or her response. In another example, the user may be prompted to input a word. The user may type an answer on a software or hardware keyboard, or write on a touchscreen with a stylus or finger to provide a response. In yet another example, the user may speak a response into a microphone of the user computing device. Speech recognition techniques known in the art may be used to convert the user's spoken response into data for processing. For example, the user may be asked to spell a word out loud or to sound out a word. The user may speak each letter, phoneme, or syllable of the word, with the spoken letters, phonemes, or syllables received through the microphone of the user computing device 102. Still other ways of receiving a user response through an input device are possible. In a still further example, the user may physically manipulate the user computing device itself as a response. For example, the user computing device may include an accelerometer, gyroscope, infrared proximity sensor, or other hardware or software for detecting motion.

At block 460, the illustrative subroutine 450 may determine whether the response provided by the user is an appropriate response. In some embodiments, the content synchronization information includes an indication of the appropriate response to a modification, substantially as discussed above with respect to FIG. 3B. The illustrative subroutine 450 may compare the user's response to the appropriate response indicated in the content synchronization information to determine whether the user provided the appropriate response.

If the user's response is neither substantially similar to nor identical to the appropriate response indicated in the content synchronization information, the illustrative subroutine 450 may optionally proceed to block 462, in which a hint may be provided to the user. The hint provided may vary based on the response type. If the user was prompted to spell a corresponding word, the hint may include providing one or more letters of the corresponding word to the user. If the user was prompted to speak the corresponding word, the hint may include audibly presenting one or more phonemes or syllables of the word to the user. If the user is prompted to select a response from a list of possible responses, one or more inappropriate or incorrect responses may be removed from the list. Still other types of hints are possible. Once the hint has been provided in block 462, the illustrative subroutine 450 may receive another user response in block 458.

If the user's response is substantially similar to or identical to the appropriate response indicated in the content synchronization information, the illustrative subroutine 450 may proceed to block 464, in which the corresponding word may optionally be audibly and/or textually presented without modification. The illustrative subroutine 450 may then finish in block 466. Once the illustrative subroutine 450 has been completed, the illustrative routine 400 may proceed to block 416 shown in\ FIG. 4A at which the presentation position of the audio content may be updated as discussed above. The illustrative routine 400 may then proceed to block 418.

At block 418, the presentation position of the textual content may be updated. In a specific example, this may include turning the page of an electronic book in block 418 when the playback of an audiobook has advanced in block 416 beyond the text associated with a page being displayed or to the end of the text associated with the page being displayed. In some embodiments, the presentation position of the audio content is continually updated based on the content synchronization information and the presentation position of the textual content, for example, as previously described. In other embodiments, updating the presentation position of the textual content may include simply indicating that the word has been presented to the user.

At block 420, the illustrative routine 400 may determine whether the textual content is still being presented. If so, the illustrative routine 400 may return to block 404 and present the textual content from the updated position determined in block 418. The illustrative routine 400 may then determine in block 406 a word of the textual content at the updated presentation position corresponds to a word in the audio content at a corresponding presentation position and so forth. If the textual content is no longer being presented (e.g., a user of the user computing device 102 may have turned the user computing device 102 off, or may have closed an application used to present content), then the illustrative routine 400 may finish at block 422.

As discussed above, several use cases may be achieved by the selective synchronization service, as illustrated in FIG. 5A, FIG. 5B, FIG. 5C and FIG. 5D, in which identical reference numbers refer to similar or identical elements. The user computing device 102 may audibly present audio in an item of audio content via one or more speakers 502 and/or one or more audio outputs, which may be provided to speakers or headphones. The user computing device 102 may also textually present a companion item of textual content with which an item of audio content is synchronized on the display 500. In some embodiments, a corresponding word is synchronously audibly and textually presented as discussed above. The corresponding word (and one or more nearby words) may optionally be highlighted in the text on the display 500 as the corresponding word is audibly presented via the speakers 500. In some embodiments, highlighting is only provided for a corresponding word that is synchronously audibly and textually presented, while in other embodiments, highlighting is provided both for corresponding words that are synchronously audibly and textually presented and for words that are textually presented without necessarily being audibly presented.

Figure 5A:
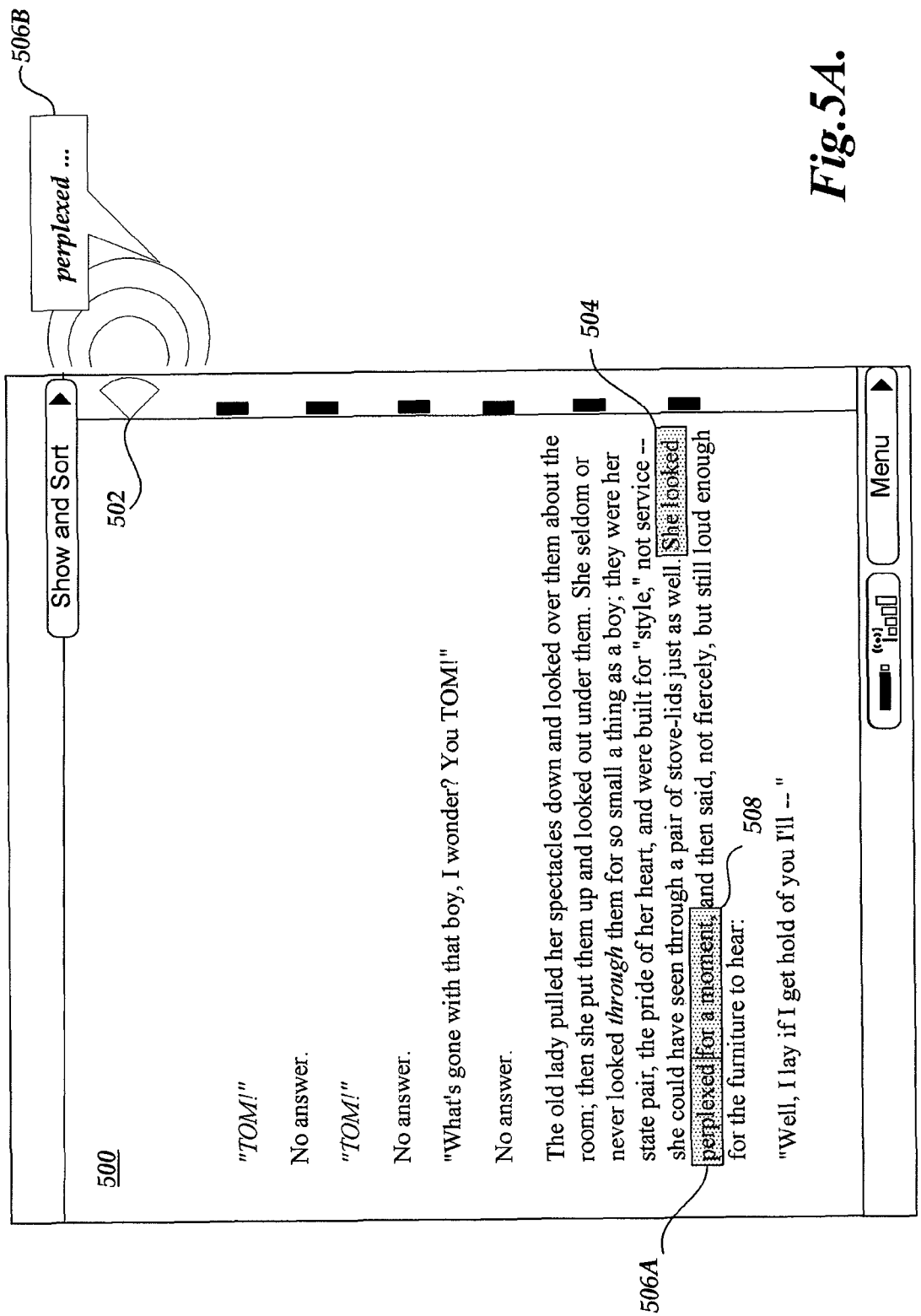
FIG. 5A, FIG. 5B, FIG. 5C and FIG. 5D are pictorial diagrams depicting illustrative synchronous presentations of audio content and textual content.

With specific reference to the example shown in FIG. 5A, certain words of the text that are textually presented on the display 500 have been selected for textual presentation without audible presentation. The user computing device 102 may cause a textual presentation 504 of the words "She looked," which textual presentation may optionally include highlighting the textually presented words. An audible presentation of the words "She looked" is not provided in this example, however, even though the item of audio content may include the words "she looked" at a presentation position that corresponds to the presentation position in the item of textual content of the words "She looked." However, for the word "perplexed," a synchronous textual presentation 506A and audible presentation 506B may be provided by the user computing device, such that the word "perplexed" is displayed (and optionally highlighted) in the text at least substantially while the word "perplexed" is audibly presented. The user computing device 102 may further cause a textual presentation 508 of the words "for a moment," which textual presentation may optionally include highlighting the textually presented words. Again, an audible presentation of the words "for a moment" is not provided in this example, even though the item of audio content may include the words "for a moment" at a presentation position that corresponds to the presentation position in the item of textual content of the words "for a moment."

In some examples, the corresponding words for which synchronous audible and textual presentation is to be provided may be relatively spread apart in terms of presentation positions. Highlighting may not necessarily be provided for any words between the corresponding words to be synchronously presented. Accordingly, the user computing device 102 may be configured to estimate a time at which the user reaches the synchronously presented corresponding words based on the user's average reading speed (as may be measured in words per unit time, pages per unit time, etc.) and on the number of words between the synchronously presented corresponding words. Further information about estimating a user's reading speed may be found in U.S. patent application Ser. No. 13/536,711, entitled "PACING CONTENT" and filed on Jun. 28, 2012; and in U.S. patent application Ser. No. 13/662,306, entitled "CONTENT PRESENTATION ANALYSIS" and filed on Oct. 26, 2012. The disclosures of both of these applications are hereby incorporated by reference in their entireties.

Figure 5B:
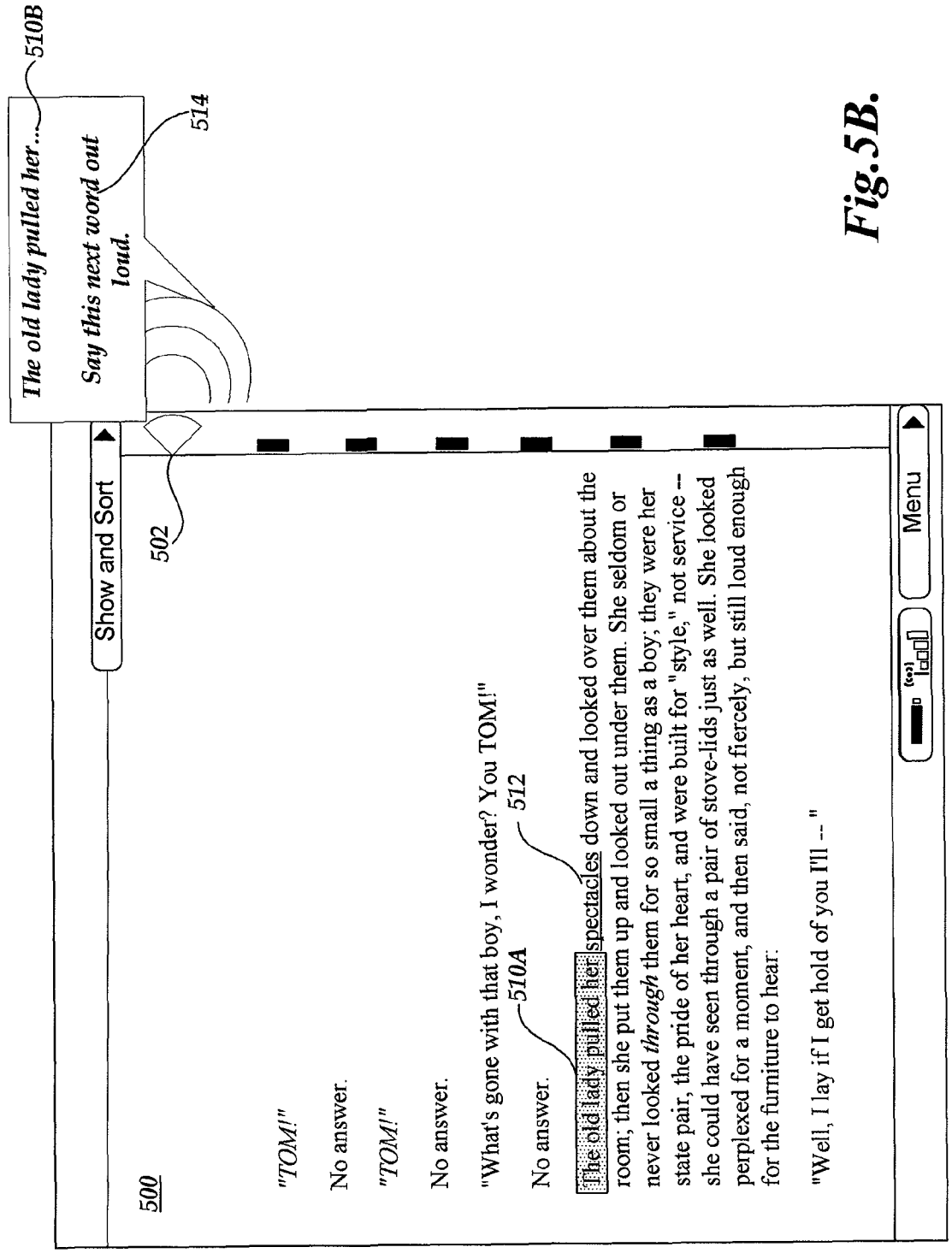

Turning now to FIG. 5B, the user computing device 102 may cause a synchronous textual presentation 510A and audible presentation 510B of one or more corresponding words. When the presentation position of a subsequent corresponding word 512 is reached, the synchronous presentation may be halted, and the user may be provided with a prompt 514 to speak the corresponding word 512 (e.g., the corresponding word may be an appropriate response to the modification of muting the audio presentation of the corresponding word). Once the user speaks the corresponding word 512 in response to the prompt 514, the synchronous presentation of subsequent corresponding words may continue. Optionally, the user computing device 102 may determine whether the user pronounced the corresponding word correctly, and/or may cause an audible presentation of the corresponding word responsive to the user speaking the corresponding word.

Figure 5C:
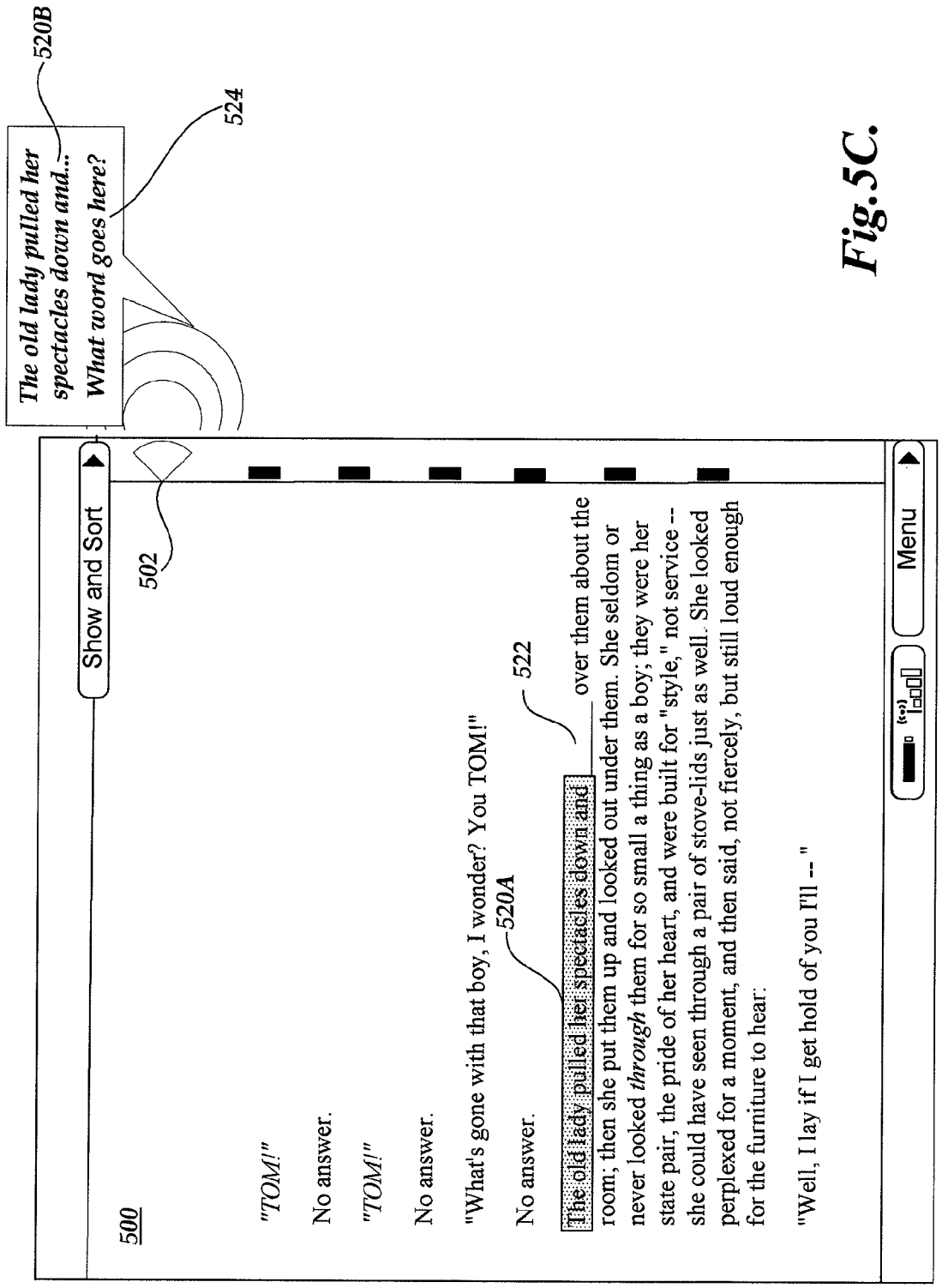

With reference to FIG. 5C, the user computing device 102 may again cause a synchronous textual presentation 520A and audible presentation 520B of one or more corresponding words. Here, however, the audible presentation of the word "looked" has been muted, and the word "looked" has been replaced in the text with a blank 522. The user may be provided with a prompt 524 to "fill in the blank." The appropriate response may include, for example, a spoken or typed word that is either the corresponding word or a synonym for the corresponding word. Once the user provides an appropriate response, the synchronous presentation of subsequent corresponding words may continue. Advantageously, a doze exercise implementation of the selective synchronization service may be achieved. Optionally, the user computing device 102 may cause an audible, textual, or synchronous audible and textual presentation of the corresponding word responsive to the user providing a response.

Figure 5D:
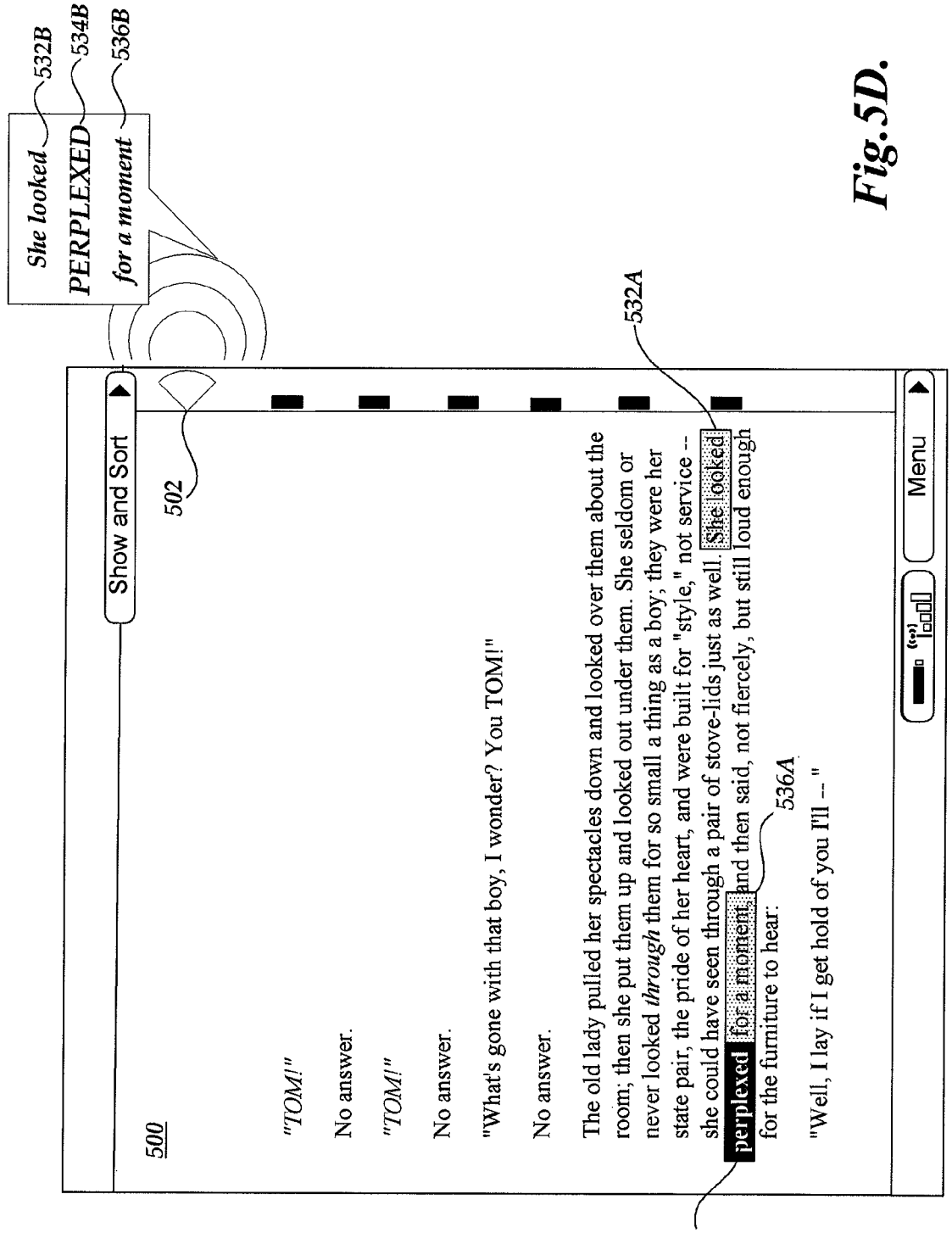

Turning now to FIG. 5D, the user computing device 102 may cause a synchronous presentation of one or more corresponding words, as indicated by textual presentations 532A and 536A and audible presentations 532B and 536B. The textual presentations 532A and 536A may include a first form of highlighting (or other indication) to help the user keep his or her place in the synchronous presentation, such that a corresponding word in the item of textual content is displayed and highlighted while the corresponding word is spoken in the item of audio content. However, a selected corresponding word may be indicated with a different type of highlighting, as shown by modified textual presentation 534A, in which the word "perplexed" is highlighted differently from other synchronously presented corresponding words. Likewise, the selected corresponding word may presented synchronously, but at a different volume or presentation rate than other corresponding words, as indicated by modified audible presentation 534B.

The synchronous presentations and modified synchronous presentations shown in and discussed with respect to FIG. 5A. FIG. 5B, FIG. 5C and FIG. 5D are for illustrative purposes only and are not intended to limit the scope of the present disclosure. Many other use cases are possible and are within the scope of the present disclosure.

For illustrative purposes, the content synchronization information discussed herein includes indications of modifications to the synchronous presentation of one or more corresponding words. However, in some embodiments, the user computing device 102 may obtain content synchronization information that indicates corresponding presentations of corresponding words, without necessarily indicating any selective synchronizations or modifications to the synchronous presentation. Rather, the user computing device 102 may be configured to select for synchronous presentation one or more corresponding words as indicated in the content synchronization information. The user computing device 102 may also be configured to modify an audible or textual presentation of a corresponding word indicated in the content synchronization information. Further, in some embodiments, the user computing device 102 (or other computing device implementing the selective synchronization service) may not generate or obtain content synchronization information at all, but may instead dynamically determine a synchronization between an item of audio content and an item of textual content. Example techniques for synchronizing content are discussed in U.S. patent application Ser. No. 13/604,482, entitled "IDENTIFYING CORRESPONDING REGIONS OF CONTENT" and filed on Sep. 5, 2012; and in U.S. patent application Ser. No. 13/604,486, entitled "SELECTING CONTENT PORTIONS FOR ALIGNMENT" and filed on Sep. 5, 2012. The disclosures of both of these applications were previously incorporated by reference in their entireties above.

Additionally, various embodiments of the selective synchronization service discussed herein refer to a "corresponding word" for illustrative purposes. However, the selective synchronization service may also provide for the synchronous or modified synchronous presentation of one or more corresponding phrases, sentences, or paragraphs, each of which may be a phrase, sentence, or paragraph that has a corresponding presentation position in an item of textual content and an item of audio content. A corresponding phrase, sentence, or paragraph may include one or more corresponding words. In an application of these embodiments, a particular corresponding word and one or more corresponding words near the particular corresponding word may be selected for synchronous audible and textual presentation. Advantageously, the user may hear and read the particular corresponding word in the context of the one or more nearby corresponding words.

While the present disclosure discusses examples of synchronously presenting content for illustrative purposes, the principles and advantages described herein may be applied to other ways of synchronizing content. Any combination of features described herein may be applied to other forms of content synchronization, as appropriate. For example, content synchronization information can be used to switch back and forth between presenting audio content and textual content. More specifically, in some embodiments, a computing device can display the text of an electronic book and then switch to playing the audio of an audiobook at a corresponding position using the content synchronization information. As another example, the principles and advantages described herein can be used to synchronize companion content on different computing devices outside the context of synchronously presenting companion content. For instance, any combination of features described herein can be applied to any of the examples of synchronizing content on different computing devices described in U.S. patent application Ser. No. 13/070,313, filed on Mar. 23, 2011, entitled "SYNCHRONIZING DIGITAL CONTENT," and in U.S. patent application Ser. No. 12/273,473, filed Nov. 18, 2008, entitled "SYNCHRONIZATION OF DIGITAL CONTENT." These applications were previously incorporated by reference in their entireties above.

Items of companion content may be acquired and stored on the user computing device 102 in a variety of ways, such as by purchasing, streaming, borrowing, checking out, renting, permanently leasing, temporarily leasing, or otherwise obtaining temporary or permanent access to items of companion content. In one specific example, a user may have purchased both an electronic book and an audiobook from a network-based retail content provider. In another specific example, the user may check out an audiobook and synchronously present the audiobook with an electronic book that the user has purchased. In another specific example, the user may lease an audiobook and synchronously present the audiobook with a borrowed electronic book.

Many of the operations of the selective synchronization service are sufficiently mathematically or technically complex that one or more computing devices may be required to carry them out. In particular, presenting digital content, communicating over a network and synchronizing content may effectively require resort to one or more computing devices.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is otherwise understood with the context as used in general to present that an item, term, etc. may be either X, Y, or Z, or a combination thereof. Thus, such conjunctive language is not generally intended to imply that certain embodiments require at least one of X, at least one of Y and at least one of Z to each is present.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. Nothing in the foregoing description is intended to imply that any particular feature, characteristic, component, step, module, or block is necessary or indispensable. All such modifications and variations are intended to be included herein within the scope of this disclosure and protected by the following claims.

What is claimed is:

1. A system comprising:
   an electronic data store configured to store:
      an audiobook; and
      an electronic book that is a companion to the audiobook; and
   a computing device, comprising a physical processor, that is in communication with the electronic data store, the computing device configured to:
      identify a plurality of words that correspond between the audiobook and the electronic book, wherein each of said plurality of words occurs in both the audiobook and the electronic book in identical order;

select a word, from the plurality of words, for modified presentation;

cause textual presentation of the plurality of words;

during the textual presentation of the plurality of words, cause audible presentation of one or more words, from the plurality of words, that precede the word selected for modified presentation without causing audible presentation of the word selected for modified presentation;

prompt a user to speak the word selected for modified presentation;

obtain a spoken response as audio input;

determine that the spoken response includes the word selected for modified presentation; and subsequent to determining that the spoken response includes the word selected for modified presentation, cause audible presentation of one or more words, from the plurality of words, that follow the word selected for modified presentation.

2. The system of claim 1, wherein the computing device is configured to cause a synchronous audible and textual presentation of each of the plurality of words other than the word selected for modified presentation.

3. The system of claim 2, wherein the computing device is configured to cause the synchronous audible and textual presentation in part by:
at least substantially while causing audible presentation of a first word of the plurality of words, causing a highlighted textual presentation of the first word.

4. The system of claim 1, wherein the word selected for modified presentation is selected from the plurality of words based at least in part on user input.

5. The system of claim 1, wherein the plurality of words is less than all words that correspond between the audiobook and the electronic book.

6. The system of claim 1, wherein the audio input is received from a microphone, wherein the computing device is further configured to identify a spoken word in the audio input at least in part by applying a speech recognition technique to one or more spoken phonemes in the audio input.

7. A computer-implemented method comprising:
under control of one or more computing devices configured with specific computer-executable instructions,
identifying a first corresponding word, wherein the first corresponding word occurs in both an item of textual content and in an item of audio content;
identifying a second corresponding word, wherein the second corresponding word occurs after the first corresponding word in both the item of textual content and in the item of audio content;
identifying a third corresponding word, wherein the third corresponding word occurs after the second corresponding word in both the item of textual content and in the item of audio content;
causing a synchronous audible and textual presentation of the first corresponding word;
causing a textual presentation of the second corresponding word without synchronously audibly presenting the second corresponding word;
prompting a user to speak the second corresponding word;
obtaining a spoken response as audio input;
determining that the spoken response includes the second corresponding word; and
in response to determining that the spoken response includes the second corresponding word, causing audible presentation of the third corresponding word.

8. The computer-implemented method of claim 7, wherein the first corresponding word and the second corresponding word are separated by a predetermined number of words in the textual content.

9. The computer-implemented method of claim 7 further comprising:
prior to obtaining the spoken response as audio input:
receiving an initial spoken response as audio input;
determining that the initial spoken response does not comprise the second corresponding word; and
providing a hint regarding the second corresponding word.

10. The computer-implemented method of claim 7, wherein the second corresponding word comprises at least a first phoneme and a second phoneme, the computer-implemented method further comprising:
causing an audible presentation of the first phoneme;
prompting a user to speak the first phoneme;
responsive to the user speaking the first phoneme, causing an audible presentation of the second phoneme;
prompting the user to speak the second phoneme; and
responsive to the user speaking the second phoneme, causing an audible presentation of the second corresponding word.

11. The computer-implemented method of claim 7 further comprising:
before causing textual presentation of the second corresponding word, prompting a user to input a word; and
determining that the input word is substantially identical to the second corresponding word or that the input word is a synonym for the second corresponding word;
wherein the textual presentation of the second corresponding word is only caused if the input word is substantially identical to the second corresponding word or the input word is a synonym for the second corresponding word.

12. The computer-implemented method of claim 7 further comprising obtaining content synchronization information pertaining to the item of textual content and the item of audio content, and wherein the first corresponding word is identified based at least in part on the content synchronization information.

13. The computer-implemented method of claim 7, further comprising:
causing textual presentation of the third corresponding word prior to prompting the user to speak the second corresponding word.

14. A system comprising:
an electronic data store configured to store content synchronization information, wherein the content synchronization information indicates a plurality of words that occur in both an item of textual content and in an item of audio content; and
a computing device, comprising a physical processor, that is in communication with the electronic data store, the computing device configured to:
select a word, from the plurality of words, for modified audible presentation;
cause a textual presentation of one or more words, from the plurality of words, that precede the word selected for modified audible presentation;
prompt a user to input the word selected for modified audible presentation;
receive a response to the prompt as one of audio input or textual input;

determine that the response includes the word selected for modified audible presentation; and subsequent to determining that the response includes the word selected for modified audible presentation, cause audible presentation of one or more words, from the plurality of words, that follow the word selected for modified audible presentation.

15. The system of claim 14, wherein the computing device is further configured to cause modified audible presentation of the word selected for modified audible presentation by muting the word during audible presentation of the audio content.

16. The system of claim 15, wherein the prompt requests that the user speak the word selected for modified audible presentation, and wherein the response is received as speech from a microphone.

17. The system of claim 16, wherein the computing device is further configured to:
determine that the speech comprises the word selected for modified audible presentation;
determine that the word was spoken with an incorrect pronunciation; and
provide a pronunciation hint to the user.

18. The system of claim 14, wherein:
the one or more words that precede the word selected for modified audible presentation are audibly presented at a first presentation rate; and
the computing device is configured to cause modified audible presentation of the word selected for modified audible presentation at a second presentation rate.

19. The system of claim 18, wherein the second presentation rate is slower than the first presentation rate.

20. The system of claim 14, wherein the computing device is configured to cause modified audible presentation of the word selected for modified audible presentation by audibly presenting the word with an incorrect pronunciation.

21. A non-transitory computer-readable medium having stored thereon computer-executable instructions configured to execute in one or more processors of a computing device, wherein the computer-executable instructions when executed cause the computing to:
identify a corresponding word, wherein the corresponding word occurs at a corresponding presentation position in both an item of textual content and in an item of audio content;
cause an audible presentation and textual presentation of one or more words that precede the corresponding word in both the item of textual content and in the item of audio content;
cause an audible presentation of the corresponding word in the item of audio content;
prompt a user to input the corresponding word;
receive a response to the prompt as textual input;
determine that the response includes the corresponding word; and
subsequent to determining that the response includes the corresponding word, cause audible presentation of one or more words that follow the corresponding word in the item of audio content.

22. The non-transitory computer-readable medium of claim 21, wherein the instructions further configure the computing device to cause modified textual presentation of the corresponding word by presenting at least one of a blank, a homophone of the corresponding word, a misspelling of the corresponding word, or an incorrect grammatical case of the corresponding word.

23. The non-transitory computer-readable medium of claim 22, wherein the prompt requests that the user spell the corresponding word.

24. The non-transitory computer-readable medium of claim 21, wherein the instructions further cause the computing device to cause a modified textual presentation of the corresponding word.

25. The non-transitory computer-readable medium of claim 24, wherein causing the modified textual presentation comprises highlighting the corresponding word.

26. The non-transitory computer-readable medium of claim 24, wherein the corresponding word is caused to be textually presented at a presentation position other than the corresponding presentation position.

27. The non-transitory computer-readable medium of claim 21, wherein the corresponding word is identified based at least in part on content synchronization information pertaining to the item of textual content and the item of audio content.

* * * * *